Figure 1:
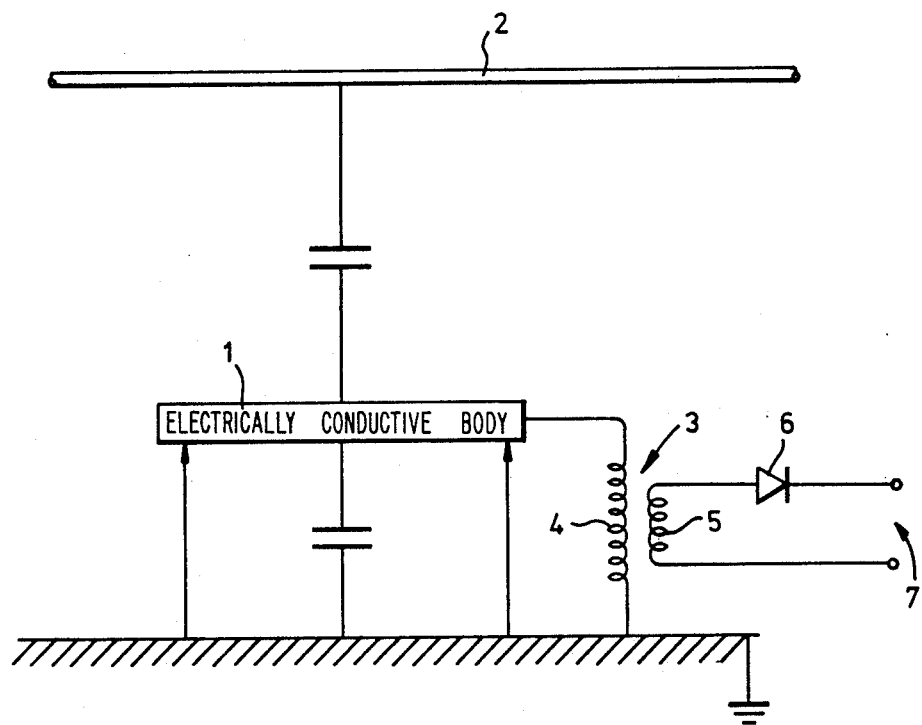

United States Patent [19]

Dey

[11] 4,442,364
[45] Apr. 10, 1984

[54] OVERHEAD ELECTRIC TRANSMISSION SYSTEMS

[75] Inventor: Philip Dey, New Barnet, England

[73] Assignee: BICC Public Limited Company, London, England

[21] Appl. No.: 399,914

[22] Filed: Jul. 19, 1982

[30] Foreign Application Priority Data

Jul. 21, 1981 [GB] United Kingdom ............ 8122471

[51] Int. Cl.³ .............................................. H02G 7/20
[52] U.S. Cl. ............................. 307/147; 340/310 A; 343/703; 455/601
[58] Field of Search ............ 307/66, 104, 145, 147, 307/148; 343/703; 340/310 A; 455/601

[56] References Cited

U.S. PATENT DOCUMENTS

| | | | |
|---|---|---|---|
| 3,540,057 | 11/1970 | Persson et al. | 343/703 |
| 3,700,900 | 10/1972 | Herleikson | 455/601 |
| 3,701,944 | 10/1972 | Amalric | 307/147 X |
| 4,219,742 | 8/1980 | Ponder | 307/147 |
| 4,366,389 | 12/1982 | Hussey | 307/66 |

FOREIGN PATENT DOCUMENTS 1598438  9/1981  United Kingdom .

OTHER PUBLICATIONS

Optical Fibre Communication Using Overhead Transmission Lines, Aug. 27, 1980, Cigre, Paris.

Primary Examiner—E. A. Goldberg
Assistant Examiner—Derek Jennings
Attorney, Agent, or Firm—Buell, Blenko, Ziesenheim & Beck

[57] ABSTRACT

In an overhead electric transmission system in which an overhead conductor includes at least one optical fibre constituting part of an optical communication system, there is provided, at a tower along the system, an electrically conductive rod supported by and electrically insulated by an insulator from the cross-arm of the tower but electrically connected to earth through the primary winding of a step-down voltage transformer. The rod is substantially horizontal and substantially parallel to a group of overhead electric conductors suspended from the cross-arm by an insulator. The surface area of the metal rod and its position with respect to the group of current-carrying conductors of the system are such that electrical power for regenerators or other ancillary equipment of the optical communication system is provided across the secondary winding of the transformer, thereby affording simple and inexpensive means of providing such power.

8 Claims, 3 Drawing Figures

OVERHEAD ELECTRIC TRANSMISSION SYSTEMS

This invention relates to overhead electric transmission systems of the kind in which one or more than one overhead electric conductor, along which an alternating current is caused to flow, is freely supported in long lengths between spaced pylons, towers, masts or other spaced supports, all such supports hereinafter being included in the generic term "tower".

According to the present invention, we provide an overhead electric transmission system of the kind specified, wherein, at at least one tower along the system, at least one electrically conductive body is supported by and electrically insulated with respect to the tower and is electrically connected to earth through the primary winding of a step-down voltage transformer, the electrically conductive surface area of the or each electrically conductive body and its position with respect to a current-carrying overhead conductor of the transmission system being such that electrical power for ancillary equipment is provided across the secondary winding of the transformer.

The or each electrically conductive body supported by the tower may take any convenient form but, preferably, it comprises a substantially rigid elongate member of electrically conductive metal or metal alloy which may be mounted on or suspended from a cross-arm of the tower with its axis substantially horizontal and substantially parallel to the associated current-carrying overhead conductor, or it comprises a flexible sheet or mesh of electrically conductive metal or metal alloy which may be mounted on or suspended from a cross-arm so that it lies in a substantially horizontal plane and/or mounted on a side face of the tower so that it lies in a vertical or approximately vertical plane.

In all cases, the combination of a current-carrying overhead conductor and the electrically conductive body or bodies supported by and electriclly insulated with respect to the tower constitutes a relatively simple and inexpensive capacitive potential divider.

The invention as hereinbefore described is especially, but not exclusively, applicable to overhead electric transmission systems of the kind specified in which the overhead electric conductor, or at least one of the overhead electric conductors, includes at least one optical guide of an optical communication system for the transmission of light. One preferred overhead electric conductor incorporating an optical guide is described and claimed in the Complete Specification of our British Pat. No. 1598438.

In an optical communication system, regenerators and/or other electrically powered ancillary equipment associated with the optical communication system are generally located at intervals, e.g. of 20 to 30 kilometers, along the system and, at each of these locations, a small amount of power, e.g. 10 to 12 watts, is required for such equipment. The present invention provides a relatively simple and inexpensive means of providing such small amounts of power.

Thus, according to a further aspect of the invention, we provide an overhead electric transmission and optical communication system, wherein, at at least one tower along the system, electrical power for a regenerator and/or other electrically powered ancillary equipment of the optical communication system is derived from at least one electrically conductive body supported by and electrically insulated with respect to the tower and electrically connected to earth through the primary winding of a step-down voltage transformer, the electrically conductive surface area of the or each electrically conductive body and its position with respect to a current-carrying overhead conductor of the transmission system being such that said electrical power is provided across the secondary winding of the transformer.

Preferably, in all cases the secondary winding of the step-down voltage transformer is connected to current rectifying means.

The regenerator and/or other electrically powered ancillary equipment of the optical communication system may also be connected to at least one stand-by battery via automatic switching means by which the battery is automatically brought into operation in the event of a power failure in the transmission system.

Figure 2:
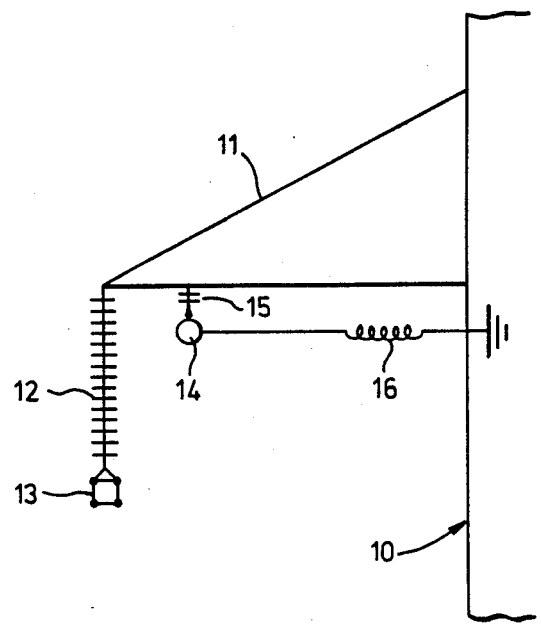
Figure 3:
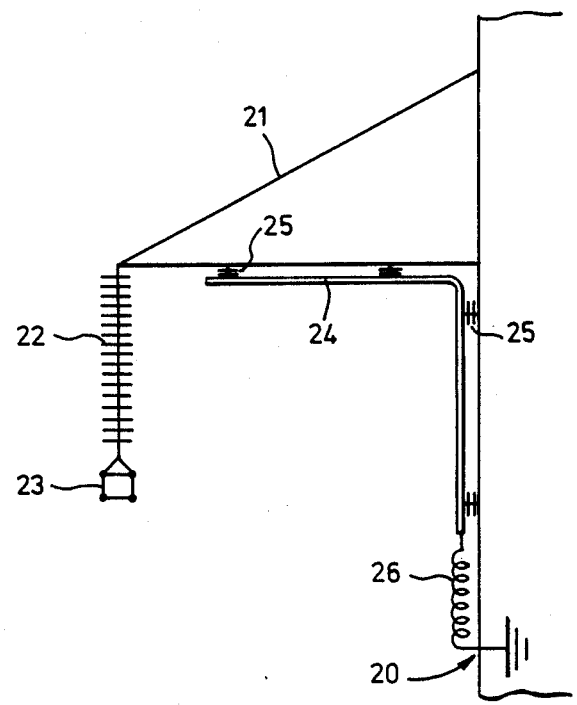

The invention is further illustrated by a description, by way of example, of the electrical circuit of the preferred arrangement for supplying electrical power to a regenerator of an overhead optical communication system, and of two preferred forms of electrically conductive body supported by and electrically insulated with respect to towers of overhead electric transmission and optical communication systems for use in the preferred arrangement, with reference to the accompanying drawings, in which:

FIG. 1 is a diagrammatic representation of the electrical circuit of the preferred arrangement, and, FIGS. 2 and 3 are fragmental diagrammatic side elevations of towers of overhead electric transmission and optical communication systems showing the two preferred forms of electrically conductive body.

As will be seen on referring to FIG. 1, in the electrical circuit of the preferred arrangement for supplying electrical power to a regenerator of an overhead optical communication system, the electrically conductive body 1 is electrically insulated with respect to earth and is so positioned with respect to a current-carrying overhead electric conductor 2 that the combination constitutes a relatively simple and inexpensive capacitive potential divider. The electrically conductive body 1 is electrically connected to earth through the primary winding 4 of a surge protected step-down voltage transformer 3 whose secondary winding 5 is connected through current rectifying means 6 to provide a low voltage supply 7 for a regenerator of an overhead optical communication system. The electrically conductive surface area of the electrically conductive body 1 and its position with respect to the current-carrying overhead electric conductor 2 are such that sufficient electrical power is provided across the secondary winding 5 of the transformer 3 for the regenerator of the overhead optical communication system.

Referring to FIG. 2, the cross-arm 11 of a tower 10 has suspended from its outer end an insulator 12 which supports a group 13 of current-carrying electric conductors. Inwardly of the insulator 12 is a metal rod 14 which is suspended from and electrically insulated with respect to the cross-arm 11 by an electric insulator 15. The metal rod 14 is arranged with its axis substantially horizontal and substantially parallel to the group 13 of current-carrying electric conductors and is electrically connected to earth through the primary winding 16 of a surge protected step-down voltage transformer (not shown).

In the arrangement shown in FIG. 3, the cross-arm 21 of a tower 20 has suspended from its outer end an insulator 22 supporting a group 23 of current-carrying electric conductors. Supported by, and electrically insulated by insulators 25 from, the cross-arm 21 and tower 20 is a flexible mesh 24 of electrically conductive metal, part of which lies in a substantially horizontal plane and part of which lies in an approximately vertical plane. The metal mesh 24 is electrically connected to earth through the primary winding 26 of a surge protected step-down transformer (not shown).

In the arrangements shown in both FIGS. 2 and 3, the secondary windings of the step down voltage transformers are connected through current rectifying means to provide a low voltage supply and the electrically conductive surface area of the metal rod 14 and metal mesh 24 and its position with respect to the group 13 or 23 of current-carrying overhead electric conductors are such that sufficient electrical power for the regenerator of the overhead optical communication system is provided across the secondary winding of the step-down transformer.

What I claim as my invention is:

1. An overhead electric transmission and optical communication system of the kind in which at least one overhead electric conductor, along which an alternating current is caused to flow, is freely supported in long lengths between spaced towers and in which the overhead electric conductor, or at least one of the overhead electric conductors, includes at least one optical guide of the optical communication system, wherein, at at least one tower along the system, electrical power for electrically powered ancillary equipment of the optical communication system is derived from at least one electrically conductive body supported by and electrically insulated with respect to the tower and electrically connected to earth through the primary winding of a step-down voltage transformer, the electrically conductive surface area of the or each electrically conductive body and its position with respect to a current carrying overhead conductor of the transmission system being such that said electrical power is provided across the secondary winding of the transformer.

2. An overhead electric transmission and optical communication system as claimed in claim 1, wherein the secondary winding of the step-down voltage transformer is connected to current rectifying means.

3. An overhead electric transmission and optical communication system as claimed in claim 1 or 2, wherein the electrically powered ancillary equipment of the optical communication system is connected to at least one stand-by battery via automatic switching means by which the battery is automatically brought into operation in the event of a power failure in the transmission system.

4. An overhead electric transmission and optical communication system as claimed in claim 1 or 2, wherein the or each electrically conductive body supported by the tower comprises a substantially rigid elongate member of electrically conductive metal or metal alloy.

5. An overhead electric transmission and optical communication system as claimed in claim 1 or 2, wherein the or each electrically conductive body supported by the tower is a substantially rigid elongate member of electrically conductive metal or metal alloy mounted on or suspended from a cross-arm of the tower with its axis substantially horizontal and substantially parallel to the associated current-carrying overhead conductor.

6. An overhead electric transmission and optical communication system as claimed in claim 1 or 2, wherein the or each electrically conductive body supported by the tower comprises a flexible sheet or mesh of electrically conductive metal or metal alloy.

7. An overhead electric transmission system as claimed in claim 1 or 2, wherein the or each electrically conductive body supported by the tower is a flexible sheet or mesh of electrically conductive metal or metal alloy mounted on or suspended from a cross-arm so that at least a part of the sheet or mesh lies in a substantially horizontal plane.

8. An overhead electric transmission and optical communication system as claimed in claim 1 or 2, wherein the or each electrically conductive body supported by the tower is a flexible sheet or mesh of electrically conductive metal or metal alloy mounted on a side face of the tower so that at least a part of the sheet or mesh lies in an approximately vertical plane.

* * * * *